United States Patent [19]

Guttierrez et al.

[11] Patent Number: 4,936,867
[45] Date of Patent: Jun. 26, 1990

[54] NOVEL DISPERSANTS FOR OLEAGINOUS COMPOSITIONS

[75] Inventors: Antonio Guttierrez, Mercerville; Jack Ryer, East Brunswick, both of N.J.

[73] Assignee: Exxon Chemical Patents Inc., Linden, N.J.

[21] Appl. No.: 388,655

[22] Filed: Aug. 2, 1989

Related U.S. Application Data

[60] Continuation of Ser. No. 240,710, Sep. 6, 1988, abandoned, which is a division of Ser. No. 41,983, Apr. 24, 1987, Pat. No. 4,797,219.

[51] Int. Cl.$^5$ .................................................. C10L 1/18
[52] U.S. Cl. ............................................. 44/63; 44/70
[58] Field of Search ...................................... 44/63, 70

[56] References Cited

U.S. PATENT DOCUMENTS

| | | | |
|---|---|---|---|
| 2,560,202 | 7/1951 | Zimmer et al. | 252/56 R |
| 2,576,323 | 11/1951 | Whetstone | 549/427 |
| 2,798,080 | 7/1957 | Elam | 549/427 |
| 2,877,208 | 3/1959 | Lal | 549/427 |
| 2,910,520 | 10/1959 | Guest et al. | 549/427 |
| 2,921,027 | 1/1960 | Brennan | 252/56 R |
| 3,032,558 | 5/1962 | Montagna | 549/427 |
| 3,047,586 | 7/1962 | Dunlop et al. | 252/56 R |
| 3,311,559 | 3/1967 | Mottus | 252/56 R |
| 3,533,945 | 10/1970 | Vogel | 252/49.6 |
| 3,708,522 | 1/1973 | LeSuer | 260/485 G |
| 3,910,845 | 10/1975 | Coon | 252/56 R |
| 4,029,675 | 6/1977 | Williams et al. | 252/56 R |
| 4,209,411 | 6/1980 | Winans et al. | 252/56 D |
| 4,234,435 | 11/1980 | Meinhardt et al. | 252/51.5 A |
| 4,292,186 | 9/1981 | Chibrick et al. | 252/56 D |
| 4,797,219 | 1/1989 | Gutierrez et al. | 252/46. 6 |

FOREIGN PATENT DOCUMENTS 8503504 8/1985 PCT Int'l Appl. .

Primary Examiner—William R. Dixon, Jr.
Assistant Examiner—E. M. McAvoy
Attorney, Agent, or Firm—J. B. Murray, Jr.

[57] ABSTRACT

According to the present invention, novel oil soluble compositions useful as dispersants are provided by reaction of a mono- or polycarboxylic acid acylating reactant with at least one heterocyclic polyol of the formula:

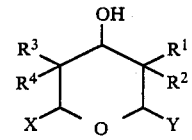

wherein $R^1$, $R^2$, $R^3$ and $R^4$ are the same or different and are selected from the group consisting of H, alkyl and —CH(OH)$R^5$, wherein $R^5$ is $C_1$ to $C_{10}$ alkyl, and wherein X and Y are the same or different and are H or $C_1$ to $C_{10}$ alkyl, with the proviso that at least one of $R^1$, $R_2$, $R_3$ and $R^4$ is the —CH(OH)$R^5$ moiety.

12 Claims, No Drawings

NOVEL DISPERSANTS FOR OLEAGINOUS COMPOSITIONS

CROSS-REFERENCE TO RELATED APPLICATIONS

This application is a Rule 60 continuation of U.S. Ser. No. 240,710, filed 9/6/88, now abandoned, which was a Rule 60 divisional of U.S. Ser. No. 41,983, filed 4/24/87, now U.S. Pat. No. 4,797,219.

BACKGROUND OF THE INVENTION

1. FIELD OF THE INVENTION

This invention relates to novel oil soluble dispersants useful as additives in fuel and lubricating oil compositions, including concentrates containing said additives, and methods for their manufacture and use.

2. DESCRIPTION OF THE PRIOR ART

High molecular weight, oil soluble, mono- and polycarboxylic acid esters, prepared by reaction of mono- or poly-carboxylic acid acylating reactants with the polyhydric alcohol pentaerythritol, have been prepared in the literature for use as dispersants in lubricants and fuels. Exemplary of these disclosures are U.S. Pat. No. 3,708,522 wherein esters of polyisobutenyl substituted succinic anhydride and pentaerythritol are post-treated with maleic anhydride to provide compositions useful as dispersants in lubricants and fuels. The reference also discloses that a preferred class of esters are prepared by reacting the mono- or polycarboxylic acid acylating reactants with aliphatic alcohol containing up to 10 carbon atoms, and that this class of alcohols includes glycerol, erythritol, pentaerythritol, gluconic acid, glyceraldehyde, glucose, arabinose, 1,7-heptanediol, 2,4-heptanediol, 1,2,3-hexanetriol, 1,2,4-hexanetriol, 1,2,5,-hexanetriol, 2,3,4,-hexanetriol, 1,2,3,-butanetriol, 1,2,4-butanetriol, quinic acid, 2,2,6,6-tetrakis-(hydroxymethyl)-cyclohexanol, 1,10-decanediol, and digitalose, and the like.

U.S. Pat. No. 3,533,945 relates to lubricating oil additives prepared by reaction of certain polyhydroxy compounds with recited amounts of a succinic acid producing compound, such as hydrocarbon substituted succinic acids or anhydrides thereof having at least 50 aliphatic carbon atoms in the hydrocarbon substituent, and at least about 1 mole of a boron reactant. The polyhydroxy compounds are recited to be substituted by more than one hydroxy group per hydrocarbon radical, and polyhydric alcohols disclosed include 1,2-cyclohexanediol and 1,3,5-cyclohexanetriol.

U.S. Pat. No. 4,209,411 relates to methylol poly ester derivatives of $C_{12}$ to $C_{22}$ hydrocarbon substituted succinic anhydride or acid which are the equimolar reaction products of the $C_{12}$ to $C_{22}$ hydrocarbon substituted succinic anhydride or acid and a cyclic poly(methylol) compound, which are disclosed to provide utility in fuels as rust inhibitors, in automatic transmission fluids as copper corrosion inhibitors, and in automotive, industrial and lubricating oils as sludge dispersants, rust inhibitors, friction reducers and copper alloy corrosion inhibitors. The cyclic poly(methylol) compounds are of the class consisting of 2,2,6,6-tetramethylol cyclohexanol, tetrahydro-3,3,5,5-tetrakis-(hydroxymethyl)-4-pyranol and tetrahydro-3,3,5-tris-(hydroxymethyl)-5-methyl-4-pyranol and have the generic structural formula as follows:

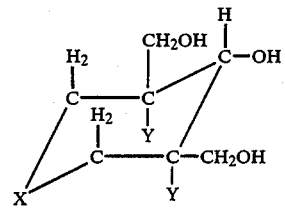

wherein Y is —$CH_3$ or —$CH_2OH$ and X is —$CH_2$— or —O—.

SUMMARY OF THE INVENTION According to the present invention, novel oil soluble compositions useful as dispersants are provided by reaction of a mono- or polycarboxylic acid acylating reactant with at least one heterocyclic polyol of the formula

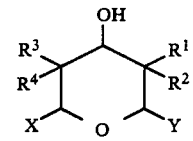

wherein $R^1$, $R^2$, $R^3$ and $R^4$ are the same or different and are selected from the group consisting of H, alkyl, and —CH(OH)($R^5$) wherein $R^5$ is H or $C_1$ to $C_{10}$ alkyl wherein X and Y are the same or different and are H or $C_1$ to $C_{10}$ alkyl, with the proviso that at least one of $R^1$, $R_2$, $R^3$ and $R^4$ is the —CH(OH)($R^5$) moiety.

The dispersants of this invention have been found to provide improved dispersancy when used in lubricating oil compositions.

According to the present invention, novel oil soluble compositions useful as dispersants are provided by reaction of (A) mono- or polycarboxylic acid acylating reactant with (B) at least one heterocyclic polyol of the formula:

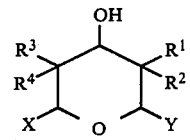

wherein $R^1$, $R^2$, $R^3$ and $R^4$ are the same or different and are selected from the group consisting of H, alkyl, and —CH(OH)($R^5$) wherein $R^5$ is as defined above wherein X and Y are as defined above, with the proviso that at least one of $R^1$, $R^2$, $R^3$ and $R^4$ is the —CH(OH)($R^5$) moiety.

Component A—Acylating Reagent

The acylating reagents useful in this invention comprise members selected from the group consisting of long chain hydrocarbon substituted mono- and dicarboxylic acids or their anhydrides, wherein said long chain hydrocarbon group is a polymer of a $C_2$ to $C_{10}$, e.g., $C_2$ to $C_5$ monoolefin, said polymer having a number average molecular weight of about 700 to about 5000.

The long chain hydrocarbyl substituted dicarboxylic acid producing material, e.g. acid or anhydride used in the invention includes a long chain hydrocarbon, generally a polyolefin, substituted typically with an average of at least about 0.8, usefully from about 1.0 to 2.0 (e.g. 1.0 to 1.6), preferably about 1.1 to 1.4 (e.g. 1.1 to 1.3)

moles, per mole of polyolefin, of an alpha- or beta-unsaturated $C_4$ to $C_{10}$ dicarboxylic acid, anhydride or ester thereof, such as fumaric acid, itaconic acid, maleic acid, maleic anhydride, chloromaleic acid, dimethyl fumarate, chloromaleic anhydride, acrylic acid, methacrylic acid, crotonic acid, cinnamic acid, and mixtures thereof.

Preferred olefin polymers for reaction with the unsaturated dicarboxylic acid anhydride or ester are polymers comprising a major molar amount of $C_2$ to $C_{10}$, e.g. $C_2$ to $C_5$, monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers will usually have number average molecular weights within the range of about 700 and about 5000, e.g. 700 to 3000, more usually between about 800 and about 2500, and will therefore usually have an average of from about 50 to 400 carbon atoms. Particularly useful olefin polymers have number average molecular weights within the range of about 800 and about 2500 with approximately one terminal double bond per polymer chain. An especially useful starting material for a highly potent dispersant additive made in accordance with this invention is polyisobutylene.

Processes for reacting the olefin polymer with the $C_{4-10}$ unsaturated dicarboxylic acid, anhydride or ester are known in the art. For example, the olefin polymer and the dicarboxylic acid material may be simply heated together as disclosed in U.S. Pat. Nos. 3,361,673 and 3,401,118 to cause a thermal "ene" reaction to take place. Alternatively, the olefin polymer can be first halogenated, for example, chlorinated or brominated to about 1 to 8 wt. %, preferably 3 to 7 wt. % chlorine, or bromine, based on the weight of polymer, by passing the chlorine or bromine through the polyolefin at a temperature of 60° to 250° C., e.g. 120° to 160° C. for about 0.5 to 10, preferably 1 to 7 hours. The halogenated polymer may then be reacted with sufficient unsaturated acid or anhydride at 100° to 250° C., usually about 180° to 220° C. for about 0.5 to 10 hours, e.g. 3 to 8 hours, so the product obtained will contain an average of about 1.0 to 2.0 moles, preferably 1.1 to 1.4 moles, e.g. 1.2 moles, of the unsaturated acid per mole of the halogenated polymer. Processes of this general type are taught in U.S. Pat. Nos. 3,087,436; 3,172,892; 3,272,746 and others.

Alternatively, the olefin polymer, and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. No. 1,440,219.

By the use of halogen, about 65 to 95 wt. % of the polyolefin, e.g. polyisobutylene will normally react with the dicarboxylic acid material Upon carrying out a thermal reaction without the use of halogen or a catalyst, then usually only about 50 to 85 wt. % of the polyisobutylene will react. Chlorination helps increase the reactivity. For convenience, all of the aforesaid functionality ratios of dicarboxylic acid producing units to polyolefin, e.g. 1.0 to 2.0, etc. are based upon the total amount of polyolefin, that is, the total of both the reacted and unreacted polyolefin, present in the resulting product formed in the aforesaid reactions.

Component B—Heterocyclic Polyol Reactant

The heterocyclic polyol reactants useful in the present invention comprise compounds of the formula (I):

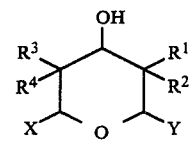

wherein $R^1$, $R^2$, $R^3$ and $R^4$ are the same or different and are selected from the group consisting of H, alkyl and —CH(OH)($R^5$) wherein $R^5$ is hydrogen or $C_1$ to $C_{10}$ alkyl, and wherein X and Y are the same or different and are H or alkyl of from 1 to 10 carbon atoms with the proviso that at least one of $R^1$, $R^2$, $R^3$ and $R^4$ is the —CH(OH)$R^5$ moiety.

When $R^1$, $R^2$, $R^3$ or $R^4$ is alkyl, the alkyl group will generally contain from 1 to 10 carbon atoms, preferably 1 to 3 carbon atoms. Exemplary of such alkyl groups are methyl, ethyl, propyl, isopropyl, butyl, isobutyl, pentyl, 3-methylbutyl, hexyl, nonyl, heptyl, decyl, isodecyl, and the like.

The $R^5$ alkyl substituent in the —CH(OH)($R^5$) moiety may be straight chain or branched chain. Preferably $R^5$ is $C_1$ to $C_5$ alkyl, with $C_1$ to $C_3$ alkyl being more preferred. Exemplary of such moieties are: —CH$_2$OH, —CH(OH)CH$_3$, —CH(OH)C$_2$H$_5$, —CH(OH)C$_3$H$_7$, —CH(OH)C$_4$H$_9$, —CH(OH)C$_5$H$_{11}$, —CH(OH)C$_6$H$_{13}$, —CH(OH)C$_7$H$_{15}$, —CH(OH)C$_8$H$_{17}$, —CH(OH)C$_9$H$_{19}$, —CH(OH)C$_{10}$H$_{21}$, and the like.

As indicated above, the heterocyclic polyols of this invention are such that at least one of $R^1$, $R^2$, $R^3$ and $R^4$ must be the —CH(OH)($R^5$) moiety. Preferably, the heterocyclic polyol of this invention will possess at least 3, most preferably 4, such —($C_nH_2$)OH moieties. Also, preferably at least two of $R_1$ and $R^2$ or $R^3$ and $R^4$ will each comprise the —CH(OH)$R^5$ moiety.

Exemplary of heterocyclic polyols of this invention are the following compounds:

TABLE I

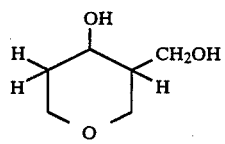 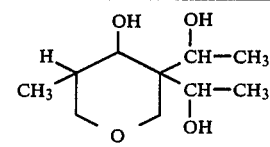

TABLE I-continued

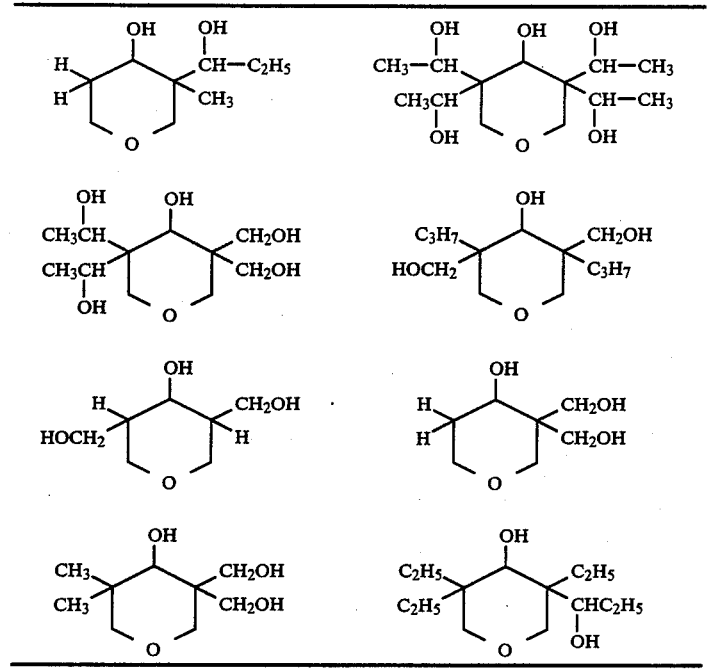

The heterocyclic polyol reactants used in the process of this invention can be prepared by conventional means, such as by a base-catalyzed condensation reaction between a ketone and aldehyde as described in U.S. Pat. No. 4,209,411. The reaction of acetone and formaldehyde to form a tetra-(-CH(OH)R$^5$)-substituted heterocyclic polyol is believed to proceed through a noncyclic intermediate, as illustrated in Equation (I) below.

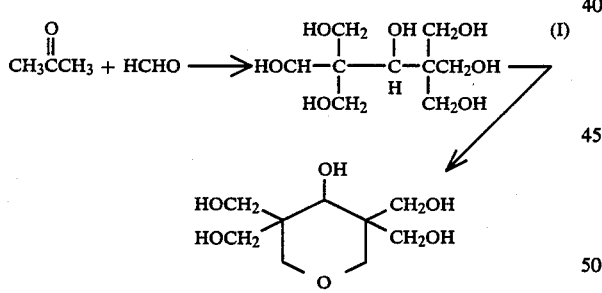

The reaction of higher aliphatic ketones with the aldehyde to form di- or tri-(-CH(OH)R$^5$ group) substituted heterocyclic polyols, can be illustrated as Equations (II) and (III):

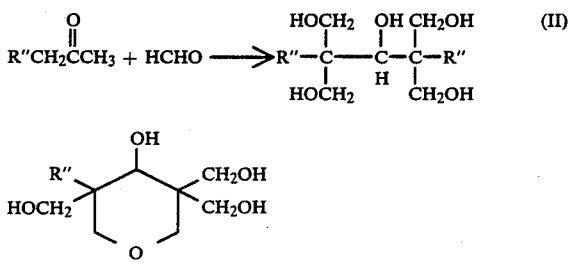

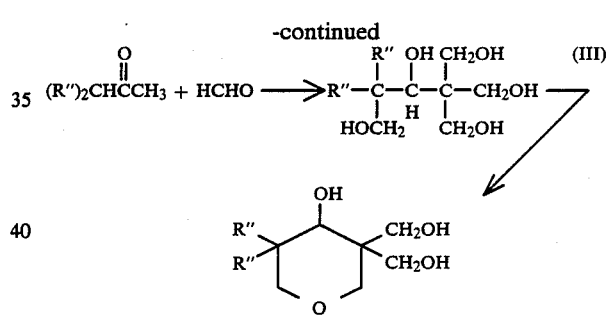

wherein R" is alkyl of from 1 to 10 carbon atoms.

The reaction of higher aldehydes with a ketone to form the heterocyclic polyol is illustrated in Equation IV.

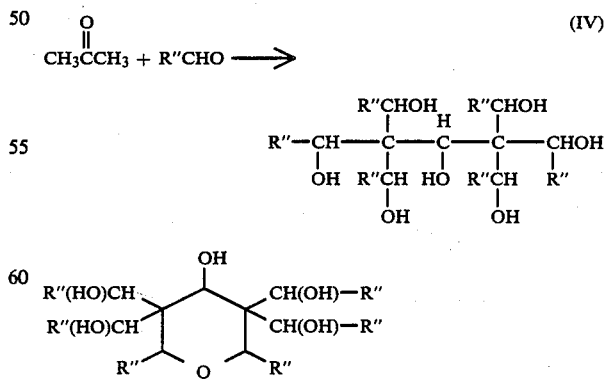

wherein R" is as defined above.

A preferred class of heterocyclic polyols are those of the formula (II)

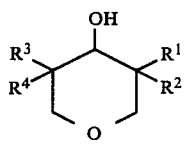

wherein $R^1$, $R^2$, $R^3$ and $R^4$ are each $-CH(OH)R^5$ wherein $R^5$ is H or $C_1$ to $C_5$ alkyl, and more preferably wherein $R^5$ is H or $C_1$ to $C_3$ alkyl.

Mixtures of any of the foregoing heterocyclic polyols can also be employed as reactant in the practice of the present invention.

Reaction Condition The formation of the novel dispersants of the present invention can be effected by reacting the selected mono- or polycarboxylic acid acylating reagent and heterocyclic polyol, preferably in the presence of an inert solvent, such as mineral oil, xylene or the like. The quantity of the acylating reagent which is used, relative to the heterocyclic polyol, can vary widely. Generally, the acylating reagent is used in an amount related to the molar equivalents of $-CH(OH)R^5$ moieties in the selected heterocyclic polyol reactant. For example, when the heterocyclic polyol reactant comprises a molecule of Formula (I) or (II) wherein $R^1$, $R^2$, $R^3$ and $R^4$ are each $-CH(OH)R^5$, the mono- or polycarboxylic acid acylating reagent will be generally used in an acylating reagent:heterocyclic polyol mole:mole ratio of from about 4:1 to 1:1, and preferably from about 1:1 to 2:1. While an excess of the acylating agent can be used if desired, this is not essential to the present invention.

The mode of addition of reactants does not appear to affect product composition and convenience will usually dictate which reagent is added to the other. It is preferred that the reaction is carried out while sparging the reactants (either neat or in an inert solvent as discussed above) with an inert gas such as nitrogen to remove water of condensation Alternatively, if the reaction is carried out in an inert solvent, the reaction of the acylating reagent and heterocyclic polyol can be conducted under conditions which permit the removal of the water of condensation by entrainment in the selected low boiling inert solvent, such as xylene.

The reaction of the acylating reagent and heterocyclic polyol can be carried out at temperatures of from about 130° to 220° C., and preferably from about 150° to 180° C. In addition, this reaction may be carried out if desired in the presence of a conventional esterification catalyst, such as para-toluene sulfonic acid, zinc acetate, stannous octanoate, tetrabutyl titanate, Amberlyst 15, and the like. The reaction will generally be carried out to completion as measured by collection of a stoichiometric amount of water of condensation or by infrared analysis of the product, which is indicated by maximum absorptions for ester functionality.

The number average molecular weights of the novel products of this invention will of course depend on the particular reactants employed and the extent to which the product is esterified. The esters formed by reaction of the recited mono- or polycarboxylic acid acylating reagent and heterocyclic polyols of this invention, wherein the polyol is substituted by four $-CH(OH)R^5$ moieties and is fully esterified by the selected acylating reagent, will generally range from about 1500 to about 11,000, and preferably from about 1800 to 5,000. The partially esterified products of this invention, wherein at least one free $-CH(OH)R^5$ moiety per molecule of product remains after the reaction with the selected acylating reagent, will generally have number average molecular weights of from about 800 to 11,000, and preferably from about 900 to 5,000, and more preferably from about 900 to 3,000.

The reaction of the acylating agent and heterocyclic polyol to form the novel dispersants of this invention can be illustrated by the following Equation V:

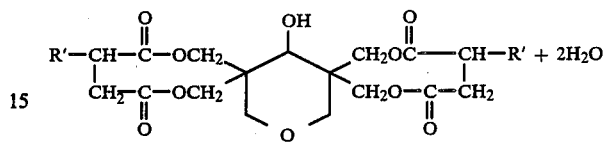

wherein R' is a long chain hydrocarbon as described above, such as polyisobutenyl having a number average molecular weight of from about 700 to 5000.

Preferably, however, the selected mono- or polycarboxylic acid acylating reagent is used in an amount less than that which would stoichiometrically provide the carboxylic acid generating groups sufficient to fully esterify the selected heterocyclic polyol, thereby producing a product having at least one free $-CH(OH)R^5$ moiety (i.e., a partially esterified heterocyclic polyol). For example, Table II below describes the preferred and most preferred relative amounts of the acylating agent and heterocyclic polyol for use in the present invention, as illustrated by Equation VI.

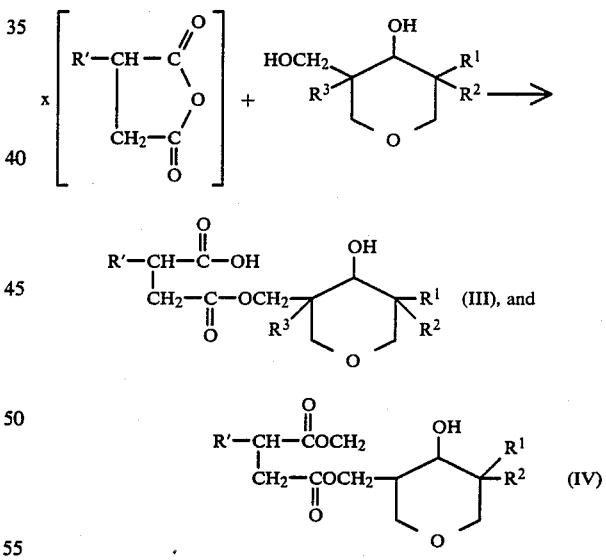

TABLE II

| | R' = long chain hydrocarbyl | | |
|---|---|---|---|
| No. of $R^1$, $R^2$, $R^3$ groups = —H or alkyl | No. of $R^1$, $R^2$, $R^3$ groups = —CH(OH)$R^5$ | Values of "x"(1) | |
| | | Preferred | Most Preferred |
| 3 | 0 | 0.5 to 4 | 1 to 2 |
| 2 | 1 | 1 to 4 | 1 to 2 |
| 1 | 2 | 1 to 4 | 1 to 2 |
| 0 | 3 | 1 to 4 | 1 to 2 |

(1) "x" as defined in Equation VI.

It will be understood that product III represents partially esterified products when at least one of $R^1$, $R^2$ and $R^3$ comprises a —CH(OH)$R^5$ moiety, and product IV represents partially esterified products when at least one of $R^1$ and $R^2$ comprises a —CH(OH)$R^5$ moiety. When at least one of $R^1$, $R^2$ and $R^3$ are —CH(OH)$R^5$ in Equation VI, the product obtained will be principally in the form of structure IV wherein each acyl group of the acylating agent is reacted with a hydroxy group of the heterocyclic polyol.

Post-Treatment

The partially esterified products of this invention may be post-treated for incorporation of additional functionality onto the free —CH(OH)$R^5$ group(s) thereof by reaction with carboxylic acids, epoxides, sulfates and the like. Fully esterified carboxylic acid products of this invention (that is, products which are substantially free of free —CH(OH)$R^5$ groups but which contain one or more (generally one or two) free —COOH groups) may also be post-treated for incorporation of additional functionality onto the free —COOH group(s) thereof by reaction with polyols, carboxylic acids, epoxides, sulfates and the like. Such reactions can be performed as described in U.S. Pat. Nos. 3,533,945; 3,639,242; 3,708,522; 3,859,318; and 3,954,639, the disclosures of which are hereby incorporated by reference.

Suitable monohydric and polyhydric alcohols which may be used as post-treating agents include monohydric and polyhydric alcohols or aromatic compounds such as phenols and naphthols, etc. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, mono-oleate of glycerol, monostearate of glycerol, monomethyl ether of glycerol, pentaerythritol, dipentaerythritol, and mixtures thereof.

The partially esterified dispersant may also be treated with unsaturated alcohols such as allyl alcohol, cinnamyl alcohol, propargyl alcohol, 1-cyclohexane-3-ol, and oleyl alcohol. Still other classes of the alcohols capable of post-treating the partial esters of this invention comprise the ether-alcohols and amino-alcohols including, for example, the oxy-alkylene, oxy-arylene-, amino-alkylene-, and amino-arylene-substituted alcohols having one or more oxy-alkylene, amino-alkylene or amino-arylene radicals. They are exemplified by Cellosolve, Carbitol, N,N,N',N'-tetrahydroxytrimethylene diamine, and ether-alcohols having up to about 150 oxy-alkylene radicals in which the alkylene radical contains from 1 to about 8 carbon atoms.

Exemplary of suitable hydroxyamines post-treatment agents are 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propane-diol, 2-amino-2-ethyl-1,3-propanediol, N-(beta-hydroxypropyl)-N'-(beta-amino-ethyl)-piperazine, tris(-hydroxymethyl) amino-methane (also known as trismethylolaminomethane), 2-amino-1-butanol, ethanolamine, beta-(beta-hydroxythoxy)-ethylamine, and the like. Mixtures of these or similar amines can also be employed.

The partial ester dispersants of this invention can be further treated by boration as generally taught in U.S. Pat. Nos. 3,087,936 and 3,254,025 (the entirety of which is incorporated by reference). This is readily accomplished by treating the partial ester dispersant with a boron compound selected from the class consisting of boron oxide, boron halides, boron acids and esters of boron acids in an amount to provide from about 0.1 atomic proportion of boron for each mole of the partial ester dispersant to about 20 atomic proportions of boron for each atomic proportion of nitrogen of the partial ester dispersant. Usefully the dispersants of the inventive combination contain from about 0.05 to 2.0 weight percent, e.g., 0.05 to 0.7 weight percent, boron based on the total weight of the partial steric dispersant. The boron, which appears to be in the product as dehydrated boric acid polymer (primarily $(HBO_2)_3$), is believe to attach to the dispersant hydroxyl group as ester salts, e.g., the metaborate salt of said ester.

Treating is readily carried out by adding from about 0.05 to 4, e.g., 1 to 3 weight percent (based on the weight of the partial ester dispersant of said boron compound, preferably boric acid which is most usually added as a slurry to the partial ester dispersant and heating with stirring at from about 135° C. to 190° C., e.g., 140° C. to 170° C., for from 1 to 5 hours followed by nitrogen stripping at said temperature ranges. Or, the boron treatment can be carried out by adding boric acid to the hot reaction mixture of the mono- or polycarboxylic acid acylating reagent and heterocyclic polyol reactant while removing water.

The partial esters of this invention can also be post-treated, if desired, with $C_5$–$C_9$ lactone, e.g., E-caprolactone, by heating a mixture of the partial ester and lactone in a reaction vessel in the absence of a solvent at a temperature of about 50° C. to about 200° C., more preferably to a temperature of about 75° C. to about 180° C., and most preferably at about 90° C. to about 160° C., for a sufficient period of time to effect reaction. Optionally, a solvent for the lactone, partial ester and/or the resulting adduct may be employed to control viscosity and/or the reaction rates.

In one preferred embodiment of the invention, the $C_5$–$C_9$ lactone, e.g., E-caprolactone is reacted with a partial ester in a 1:1 mole ratio of caprolactone to partial ester. In practice, the ratio of lactone to partial ester may vary considerably as a means of controlling the length of the sequence of the lactone units in the adduct. For example, the mole ratio of lactone to partial ester may vary from about 10:1 to about 0.1:1, more preferably from about 5:1 to about 0.2:1, and most preferably from about 2:1 to about 0.4:1. It is preferable to maintain the average degree of polymerization of the lactone monomer below about 100, with a degree of polymerization on the order of from about 0.2 to about 50 being preferred, and from about 0.2 to about 20 being more preferred. For optimum dispersant performance, sequences of from about 1 to about 5 lactone units in a row are preferred.

Catalysts useful in the promotion of the lactone-partial ester reactions are selected from the group consisting of stannous octanoate, stannous hexanoate, stannous oxalate, tetrabutyl titanate, a variety of metal organic based catalyst acid catalysts and amine catalysts, as described on page 266, and forward in a book chapter authorized by R. D. Lundberg and E. F. Cox entitled "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts per weight of catalyst per one million parts of the total reaction mixture.

Exemplary of adducts formed by reaction of partial ester dispersants of this invention with lactones as above are those adducts illustrated by the following equation:

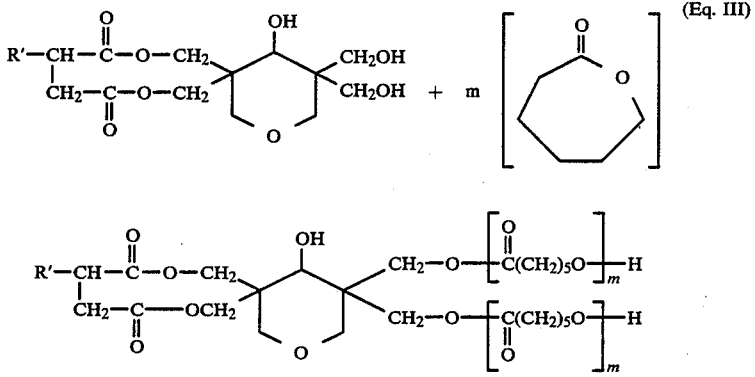

wherein R' is as described above. The reaction of such lactones with polyols is more completely described in copending U.S. application Ser. No. 916,218, filed Oct. 7, 1986, the disclosure of which is hereby incorporated by reference in its entirety.

THE COMPOSITIONS

The novel dispersants of the present invention possess very good dispersant properties as measured herein in a wide variety of environments. Accordingly, the dispersants are used by incorporation and dissolution into an oleaginous material such as fuels and lubricating oils. When the dispersants of this invention are used in normally liquid petroleum fuels such as middle distillates boiling from about 65° to 430° C., including kerosene, diesel fuels, home heating fuel oil, jet fuels, etc., a concentration of the additive fuel in the range of typically from about 0.001 to about 0.5, and preferably 0.001 to about 0.1 weight percent, based on the total weight of the composition, will usually be employed.

The dispersants of the present invention find their primary utility in lubricating oil compositions which employ a base oil in which the additives are dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the dispersants of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the dispersants of the present invention Thus, the dispersants of the present invention may be suitably incorporated into synthetic base oils such as alkyl esters of dicarboxylic acids, polyglycols and alcohols; polyalphaolefins, alkyl benzenes, organic esters of phosphoric acids, polysilicone oil, etc.

Natural base oils include mineral lubricating oils which may vary widely as to their crude source, e.g. whether paraffinic, naphthenic, mixed, paraffinic-naphthenic, and the like; as well as to their formation, e.g. distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blended oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc.

The lubricating oil base stock conveniently has a viscosity of typically about 2.5 to about 12, and preferably about 2.5 to about 9 cst. at 100° C.

Thus, the dispersants of this invention can be employed in a lubricating oil composition which comprises lubricating oil, typically in a major amount, and the dispersants typically in a minor amount, which is effective to impart enhanced dispersancy relative to the absence of the dispersants. Additional conventional additives selected to meet the particular requirements of a selected type of lubricating oil composition can be included as desired.

The dispersants employed in this invention are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the dispersants, for instance, are soluble or stably dispersible in oil to an extent sufficient to exert their intended effect in the environment in which the oil is employed Moreover, the additional incorporation of other additives may also permit incorporation of higher levels of a particular dispersant, if desired.

Accordingly, while any effective amount of the dispersant can be incorporated into the lubricating oil composition, it is contemplated that such effective amount be sufficient to provide said lube oil composition with an amount of the dispersant of typically from about 0.01 to about 10 (e.g., 0.1 to 8), and preferably from about 0.2 to about 6 weight percent of the dispersant of this invention based on the weight of the active dispersant in said composition.

Preferably, the dispersants of this invention are used in an amount sufficient to provide fully formulated lubricating oil compositions containing from about 1 to 8 wt. % of the novel dispersants of this invention.

The dispersants of the present invention can be incorporated into the lubricating oil in any convenient way. Thus, they can be added directly to the oil by dispersing, or dissolving the same in the oil at the desired level of concentration. Such blending can occur at room temperature or elevated temperatures. Alternatively, the dispersants may be blended with a suitable oil-soluble solvent and base oil to form a concentrate (e.g., "adpacks"), and then the concentrate may be blended with lubricating oil base stock to obtain the final formulation. Such concentrates will typically contain from about 20 to about 80%, and preferably from about 25 to about 65%, by weight total active additive (that is, dispersant, and any other added additive, described below), and typically from about 80 to about 20%, preferably from about 60 to about 20% by weight base oil, based on the concentrate weight.

The lubricating oil base stock for the dispersants of the present invention typically is adapted to perform a selected function by the incorporation of additives therein to form lubricating oil compositions (i.e., formulations).

Representative additional additives typically present in such formulations include viscosity modifiers, corrosion inhibitors, other dispersants, oxidation inhibitors, friction modifiers, anti-foaming agents, anti-wear agents, pour point depressants, detergents, metal rust inhibitors and the like.

The compositions of this invention can also be used with viscosity index (V.I.) improvers to form multigrade automotive engine lubricating oils. Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The viscosity modifiers may also be derivatized to include other properties or functions, such as the addition of dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Examples of suitable hydrocarbon polymers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g. with isoprene and/or butadiene and hydrogenated derivatives thereof. The polymer may be degraded in molecular weight, for example by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g. see U.S. Pat. Nos. 4,089,794; 4,160,739; 4,137,185; or copolymers of ethylene and propylene reacted or grafted with nitrogen compounds such as shown in U.S. Pat. Nos 4,068,056; 4,068,058; 4,146,489 and 4,149,984.

The preferred hydrocarbon polymers are ethylene copolymers containing from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha-olefins. While not essential, such copolymers preferably have a degree of crystallinity of less than 25 wt %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

Terpolymers, tetrapolymers, etc., of ethylene, said $C_{3-28}$ alpha-olefin, and a non-conjugated diolefin or mixtures of such diolefins may also be used. The amount of the non-conjugated diolefin generally ranges from about 0.5 to 20 mole percent, preferably from about 1 to about 7 mole percent, based on the total amount of ethylene and alpha-olefin present.

The polyester V.I. improvers are generally polymers of esters of ethylenically unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2$-$C_{20}$ aliphatic or aromatic olefin per mole of unsaturated ester, or per mole of unsaturated acid or anhydride followed by esterification. For example, copolymers of styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(beta-diethylaminoethyl)styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl-pyridine, 2-vinyl-pyridine, 3-vinyl-pyridine, 4-vinyl-pyridine, 3-methyl-5-vinyl-pyridine, 4-methyl-2-vinyl-pyridine, 4-ethyl-2-vinyl-pyridine and 2-butyl-5-vinyl-pyridine and the like.

N-vinyl lactams are also suitable, e.g., N-vinyl pyrrolidones or N-vinyl piperidones.

The vinyl pyrrolidones are preferred and are exemplified by N-vinyl pyrrolidone, N-(1-methylvinyl) pyrrolidone, N-vinyl-5-methyl pyrrolidone, N-vinyl-3,3-dimethylpyrrolidone, N-vinyl-5-ethyl pyrrolidone, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 weight percent of a sulfide of phosphorus for ½ to 15 hours, at a temperature in the range of 65° to 315° C. Neutralization of the phosphosulfurized hydrocarbon may be effected in the manner taught in U.S. Pat. No. 1,969,324.

Other dispersants which can be used in admixed with the novel dispersants of this invention include any of the known ashless dispersants, such as (i) oil soluble salts, amides, imides, oxazolines, esters or mixtures thereof of long chain hydrocarbons substituted mono- and dicarboxylic acids or their anhydrides; (ii) low chain aliphatic hydrocarbon having a polyamine attached directly thereto; and (iii) Mannich condensation products formed by condensing about a molar proportion of long chain hydrocarbon substituted phenol with about 1 to 2.5 moles of formaldehyde and about 0.5 to 2 moles of polyalkylene polyamine. The long chain hydrocarbon in (i), (ii) and (iii) corresponds to the long chain hydrocarbons discussed above Exemplary of a specially preferred other dispersants are long chain hydrocarbons succinimides, such as polyisobutylene succinimides, which are derived from polyalkylene polyamines, particularly polyalkylene polyamines containing from 5 to 9 nitrogen, atoms and —$CH_2CH_2$— groups as the alkylene moiety. Such ashless dispersants are more particularly described in U.S. Pat. No. 4,502,970 which is hereby incorporated by reference.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenol-sulfides and -thioesters having preferably $C_5$ to $C_{12}$ alkyl side chains (e.g., calcium nonylphenol sulfide, barium t-octylphenyl sulfide), dioctylphenylamine, phenylalphanaphthylamine, phosphosulfurized or sulfurized hydrocarbons, etc. Preferred oxidation inhibitors are copper antioxidants which are oil soluble copper compounds. The copper compound may be in the cuprous or cupric form. The copper may be in the form of the copper dihydrocarbyl thio- or dithio-phosphates. Alternatively the copper may be added as the copper salt of a synthetic or natural carboxylic acid. Examples include $C_{10}$ to $C_{18}$ fatty acids such as stearic or palmitic, but unsaturated acids such as oleic or branched carboxylic acids such as napthenic acids of molecular weight from 200 to 500 or synthetic carboxylic acids are preferred because of the improved handling and solubility properties of the resulting copper carboxylates. Also useful are oil soluble copper dithiocarbamates of the general formula $(R^7R^8NCSS)_nCu$ (where n is 1 or 2 and $R^7$ and $R^8$ are the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as $R^7$ and $R^8$ groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e, $R^7$ and $R^8$) will generally be about 5 or greater. Copper sulphonates, phenates, and acetylacetonates may also be used.

Exemplary of useful copper compounds are copper (CuI and/or CuII) salts of alkenyl succinic acids or anhydrides. The salts themselves may be basic, neutral or acidic. They may be formed by reacting (a) any of the materials discussed above in the Acylating Reagent section, which have at least one free carboxylic acid group with (b) a reactive metal compound Suitable reactive metal compounds include those such as cupric or cuprous hydroxides, oxides, acetates, borates, and carbonates or basic copper carbonate. Examples are Cu salts of polyisobutenyl succinic anhydride (hereinafter referred to as Cu-PIBSA), and Cu salts of polyisobutenyl succinic acid. Preferably, the selected metal employed is its divalent form, e.g., $Cu+2$ The preferred substrates are polyalkenyl succinic acids in which the alkenyl group has a molecular weight greater than about 700. The alkenyl group desirably has a $\overline{M}_n$ from about 900 to 1400, and up to 2500, with a $\overline{M}_n$ of about 950 being most preferred. Especially preferred are Cu salts of polyisobutylene succinic acid (PIBSA). These materials may desirably be dissolved in a solvent, such as a mineral oil, and heated in the presence of a water solution (or slurry) of the metal bearing material. Heating may take place between 70° and about 200° C. Temperatures of 110° to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-PIBSA, Cu-oleate, or mixtures thereof) will be generally employed in an amount of from about 50–500 ppm by weight of the metal, in the final lubricating or fuel composition.

Rust inhibitors which may be employed in this invention include non-ionic surfactants such as polyoxyalkylene polyols and esters thereof and anionic surfactants such as alkyl and alkylene earth metal salts of alkyl sulfonic acids.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxy-alkylene hydrocarbyl succinimide, S-carboxyalkylene hydrocarbyl succinamic acid and mixtures thereof; U.S. Pat. No. 3,879,306 which discloses N-(hydroxy-alkyl) alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides The disclosures of the above references are herein incorporated by reference. The most preferred friction modifiers are succinate esters, or metal salts thereof, of hydrocarbyl substituted succinic acids or anhydrides and thiobis alkanols such as described in U.S. Pat. No. 4,344,853.

Pour point depressants lower the temperature at which the fluid will flow or can be poured. Such depressants are well known. Typical of those additives which usefully optimize the low temperature fluidity of the fluid are $C_8$–$C_{18}$ dialkylfumarate vinyl acetate copolymers, polymethacrylates, and wax naphthalene.

Foam control can be provided by an antifoamant of the polysiloxane type, e.g. silicone oil and polydimethyl siloxane.

Anti-wear agents, as their name implies, reduce wear of metal parts. Representative of conventional antiwear agents are zinc dihydrocarbyldithiophosphates, e.g., wherein the hydrocarbyl groups are the same or different and are $C_1$ to $C_{18}$ (preferably $C_2$ to $C_{12}$) alkyl, alkenyl, aryl, alkaryl, aralkyl and cycloalkyl.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (that is, overbased) metal salts, such as highly basic alkaline earth metal sulfonates (especially Ca and Mg salts) are frequently used as detergents.

The highly basic alkaline earth metal sulfonates are usually produced by heating a mixture comprising an oil-soluble alkaryl sulfonic acid with an excess of alkaline earth metal compound above that required for complete neutralization of the sulfonic and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as, for example, those obtained by alkylating benzene, toluene, xylene, naphthalene, diphenyl and the halogen derivatives such as chlorobenzene, chlorotoluene and chloronaphthalene. The alkylation may be carried out in the presence of a catalyst with alkylating agents having from about 3 to more than 30 carbon atoms such as, for example, haloparaffins, olefins that may be obtained by dehydrogenation of paraffins, polyolefins as, for example, polymers from ethylene, propylene, etc. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples of calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125% of the stoichiometric amount of metal required for complete neutralization.

The preparation of highly basic alkaline earth metal alkaryl sulfonates are generally known as earlier indicated such as in U.S. Pat. Nos. 3,150,088 and 3,150,089 wherein overbasing is accomplished by hydrolysis of the alkoxide-carbonate complex with the alkaryl sulfonate in a hydrocarbon solvent-diluent oil. It is preferable to use such a hydrocarbon solvent-diluent oil for the volatile by-products can be readily removed leaving the rust inhibitor additive in a carrier, e.g., Solvent 150N lubricating oil, suitable for blending into the lubricating oil composition. For the purposes of this invention, a preferred alkaline earth sulfonate is magnesium alkyl aromatic sulfonate having a total base number ranging from about 300 to about 400 with the magnesium sulfonate content ranging from about 25 to about 32 wt. % based upon the total weight of the additive system dispersed in Solvent 150 Neutral Oil.

Polyvalent metal alkyl salicylate and naphthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and naphthenates can be realized by utilizing alkaline earth metal, e.g., calcium, salts of mixtures of $C_8$–$C_{26}$ alkyl salicylates and phenates (see U.S. Pat. No. 2,744,069) or polyvalent metal salts of alkyl salicylic acids, said acids obtained from the alkylation of phenols followed by phenation, carboxylation and hydrolysis (U.S. Pat. No. 3,704,315) which could then be converted into highly basic salts by techniques generally known and used for such conversion. The reserve basicity of these metal-containing rust inhibitors is usefully at TBN levels of between about 60 and 150. Included with the useful polyvalent metal salicylate and napththenate materials are the methylene and sulfur bridged materials which are readily derived from alkyl substituted salicylic or naphthenic acids or mixtures of either or both with alkyl substituted phenols. Basic sulfurized salicylates and a method for their preparation is shown in U.S. Pat. No. 3,595,791.

For purposes of this disclosure the salicylate/naphthenate rust inhibitors are the alkaline earth (particularly magnesium, calcium, strontium and barium) salts of the aromatic acids having the general formula:

HOOC—ArR$^9$—X$_y$(ArR$^9$OH)$_n$ (VI)

where Ar is an aryl radical of 1 to 6 rings, R$^9$ is an alkyl group having from about 8 to 50 carbon atoms, preferably 12 to 30 carbon atoms (optimatically about 12), X is a sulfur (—S—) or methylene (—CH$_2$—) bridge, y is a number from 0 to 4 and n is a number from 0 to 4.

Preparation of the overbased methylene bridged salicylatephenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt of a methylene bridged phenol-salicylic acid of the general formula:

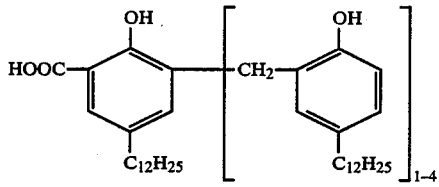
(VII)

with a TBN of 60 to 150 is representative of a rust-inhibitor highly useful in this invention.

The sulfurized metal phenates can be considered the "metal salt of a phenol sulfide" which thus refers to a metal salt, whether neutral or basic, of a compound typified by the general formula:

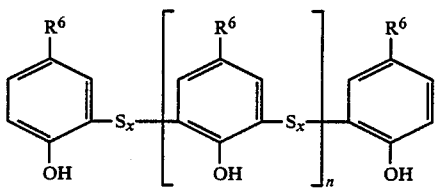
(VIII)

wherein $x=1$ or 2, $n=0$, 1 or 2, or a polymeric form of such a compound, where $R^6$ is an alkyl radical, n and x are each integers from 1 to 4, and the average number of carbon atoms in all of the $R^6$ groups is at least about 9 in order to ensure adequate solubility in oil. The individual $R^6$ groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkylphenols which are useful contain from about 2 to about 14% by weight, preferably about 4 to about 12 wt. % sulfur based on the weight of sulfurized alkylphenol.

The sulfurized alkyl phenol is converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometry, e g., basic sulfurized metal dodecyl phenate has a metal content up to and greater than 100% in excess of the metal present in the corresponding normal sulfurized metal phenates wherein the excess metal is produced in oil-soluble or dispersible form (as by reaction with $CO_2$).

According to a preferred embodiment the invention therefore provides a crankcase lubricating composition also containing from 2 to 8000 parts per million of calcium or magnesium.

The magnesium and/or calcium is generally present as basic or neutral detergents such as the sulphonates and phenates, our preferred additives are the neutral or basic magnesium or calcium sulphonates. Preferably the oils contain from 500 to 5000 parts per million of calcium or magnesium. Basic magnesium and calcium sulfonates are preferred.

These compositions of our invention may also contain other additives such as those previously described, and other metal containing additives, for example, those containing barium and sodium.

The lubricating composition of the present invention may also include copper lead bearing corrosion inhibitors. Typically such compounds are the thiadiazole polysulphides containing from 5 to 50 carbon atoms, their derivatives and polymers thereof Preferred materials are the derivatives of 1,3,4 thiadiazoles such as those described in U.S. Pat. No. 2,719,125; 2,719,126; and 3,087,932; especially preferred is the compound 2,5-bis (t-octadithio)-1,3,4 thiadiazole commercially available as Amoco 150. Other similar materials also suitable are described in U.S. Pat. Nos. 3,821,236; 3,904,537; 4,097,387; 4,107,059; 4,136,043; 4,188,299; and 4,193,882.

Other suitable additives are the thio and polythio sulphenamides of thiadiazoles such as those described in U.K. Patent Specification No. 1,560,830. When these compounds are included in the lubricating composition, we prefer that they be present in an amount from 0.01 to 10, preferably 0.1 to 5.0 weight percent based on the weight of the composition.

Some of these numerous additives can provide a multiplicity of effects, e.g. a dispersant-oxidation inhibitor. This approach is well known and need not be further elaborated herein.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Preferred Wt. % A.I. | Broad Wt. % A.I. |
|---|---|---|
| Viscosity Modifier | 0.01–4 | .01–12 |
| Detergents/Rust Inhibitors | 0.01–3 | .01–20 |
| Corrosion Inhibitor | .01–1.5 | .01–5 |
| Oxidation Inhibitor | .01–1.5 | .01–5 |
| Dispersant | .01–8 | .01–20 |
| Pour Point Depressant | .01–1.5 | .01–5 |
| Anti-Foaming Agents | .001–0.15 | .001–3 |
| Anti-Wear Agents | .001–1.5 | .001–5 |
| Friction Modifiers | .01–1.5 | .01–5 |
| Mineral Oil Base | Balance | Balance |

When other additives are employed, it may be desirable, although not necessary, to prepare additive concentrates comprising concentrated solutions or dispersions of one or more of the dispersant, anti-rust compound and copper antioxidant used in the mixtures of this invention (in concentrate amounts hereinabove described), together with one or more of said other additives (said concentrate when constituting an additive mixture being referred to herein as an additive-package) whereby several additives can be added simultaneously to the base oil to form the lubricating oil composition.

Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the additive mixture of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 7 wt. % of the additive-package with the remainder being base oil.

All of said weight percents expressed herein are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts and percentages are by weight, unless otherwise noted and which include preferred embodiments of the invention.

EXAMPLE 1

Part A

A polyisobutenyl succinic anhydride (PIBSA) having a SA:PIB ratio of about 1.3 succinic anhydride (SA) moieties per polyisobutylene (PIB) molecule (the PIB moieties having a $\overline{M}_n$ of about 1300) was aminated by reaction in S100N mineral oil with a commercial grade of polyethyleneamine (herein also referred to generically as a polyalkylene amine or PAM), which was a mixture of polyethyleneamines averaging about 5 to 7 nitrogens per molecule, to form a polyisobutenyl succinimide containing about 1.46 wt.% nitrogen (50 wt. % a.i. in S100N mineral oil).

Part B—Boration

A portion of the product of Part A was reacted with boric acid to provide a S100N solution containing a borated polyisobutenyl succinimide having a nitrogen content of about 1.46 wt. %, a boron content of 0.36 wt. % (50% ai).

EXAMPLE 2

Part A (PIBSA 52)

A polyisobutenyl succinic anhydride (PIBSA) having a SA:PIB ratio of about 1.1 succinic anhydride (SA) moieties per polyisobutylene (PIB) molecule (the PIB moieties having a $\overline{M}_n$ of about 2200 was aminated by reaction in S100N mineral oil with a commercial grade of polyethyleneamine (herein referred to as PAM) which was a mixture of polyethyleneamines averaging about 5 to 7 nitrogens per molecule, to form a polyisobutenyl succinimide containing about 0.99 wt. % nitrogen.

Part B—Boration

A portion of the product of Part A was reacted with boric acid, then cooled and filtered to give a S100N solution containing (50% ai) to provide borated polyisobutenyl succinimide having a nitrogen content of about 0.98 wt. %, a boron content of about 0.25 wt. %, and 50 wt. % of unreacted PIB and mineral oil (S100N).

EXAMPLE 3

Part A (PIBSA II2)

A polyisobutenyl succinic anhydride (PIBSA) having a SA:PIB ratio of about 1.04 succinic anhydride (SA) moieties per polyisobutylene (PIB) molecule (the PIB moieties having a $\overline{M}_n$ of about 900) was aminated by reaction in S100N mineral oil with a commercial grade of polyethyleneamine (herein also referred to generically as a polyalkylene amine or PAM), which was a mixture of polyethyleneamines averaging about 5 to 7 nitrogens per molecule, to form a polyisobutenyl succinimide containing about 1.56 wt. % nitrogen (50 wt. % a.i. in S100N mineral oil).

Part B—Boration

A portion of the product of Part A was reacted with boric acid to provide a S100N solution containing a borated polyisobutenyl succinimide having a nitrogen content of about 1.56 wt. %, a boron content of 0.40 wt. % (50% ai) and 50 wt. % of unreacted PIBSA and mineral oil (S100N).

EXAMPLE 4

Part A—Preparation of AEH [tetrahydro-3,3,5,5-tetrakis (hydroxymethyl)-4 pyranol]"Anhydroenneaheptitol"

Seventy-four grams (one mole) of calcium hydroxide was added with stirring to a mixture of 116 g (2 moles) of acetone and 485 g (16.2 moles) paraformaldehyde in 1 liter of water. External heat was applied to 40° C. to initiate the reaction which is exothermic. The reaction was not allowed to exceed 55° C. and was kept at this temperature for 2 hours. The almost clear solution was neutralized with approximately 80 g of conc. $H_2SO_4$, followed by the addition of 1 mole of oxalic acid.

The white solid was filtered and the filtrate stripped under vacuum. The residue was dissolved in methanol and filtered. This filtrate was vacuum evaporated to yield 375 g of crude product. The yield was 85%. The hydroxyl number of the product was 1029 mgs KOH per g of sample (theoretical value is 1261).

Part B

A polyisobutenyl succinic anhydride (PIBSA) having a SA:PIB ratio of about 1.3 succinic anhydride (SA) moieties per polyisobutylene (PIB) molecule of average molecular weight ($\overline{M}_n$) of about 1300 was reacted with [tetrahydro-3,5,5-tetrakishydroxymethyl)-4 pyranol] by mixing 324.6 g (0.2 mole, 59% ai) with 44.4 g (0.2 mole) of AEH prepared as in Part A above, and 107 g of mineral oil S150N mineral oil in the presence of 0.1 g of p-toluene sulfonic acid. The reaction mixture was then heated to 180° C. while stirring under nitrogen blanket. The temperature was kept at 180° C. for 4 hours while nitrogen sparging.

The progress of the reaction was followed by taking aliquots (about 0.25 cc) of the reaction mixture to which aliquots there was added an excess of diethyl amine (about 0.5 cc) at room temperature to convert any free carboxylic acid to the carboxylate anion, after which the unreacted diethyl amine was evaporated under $N_2$. The disappearance of carboxylate anion was followed by infrared. The oil solution was then filtered and collected. Infrared analysis of the filtered product by the above method showed strong hydroxyl and ester carbonyl absorption bands, and the absence of carboxylate absorption bands.

EXAMPLE 5

The procedure of Example 4, Part B was repeated, and a polyisobutylene succinic anhydride (PIBSA) 414.8 g (0.20 mole, 78% ai) having a SA:PIB ratio of 1.09 succinic anhydride (SA) moieties per polyisobutylene (PIB) molecules of an average molecular weight ($\overline{M}_n$) of 2250 was mixed with 44.4 g (0.2 mole) of AEH (prepared as in Example 4, Part A), 277 g of diluent oil (S150N) and oil of p-toluene sulfonic acid. The reaction mixture was then heated to 180° C. while stirring under nitrogen and kept at this temperature for four hours while nitrogen stripping. The filtered product gave an infrared spectra with strong hydroxyl and ester carbonyl absorption bands, and a substantial absence of carboxylate absorption bands was observed.

EXAMPLE 6

The following lubricating oil compositions were prepared using the dispersants of Examples 4 and 5 and the polyisobutenyl succinimide dispersants of Example 1, Part B; Example 2, Part B; and Example 3, Part B. The resulting compositions were then tested for sludge inhibition (via the SIB test) and varnish inhibition (via the VIB test), as described below The SIB test has been found, after a large number of evaluations, to be an excellent test for assessing the dispersing power of lubricating oil dispersant additives. The medium chosen for the SIB test was a used crankcase mineral lubricating oil composition having an original viscosity of about 325° SUS at 38° C. that had been used in a taxicab that was driven generally for short trips only, thereby causing a buildup of a high concentration of sludge precursors. The oil that was used contained only a refined base mineral lubricating oil, a viscosity index improver, a pour point depressant and zinc dialkyldithiophosphate anti-wear additive The oil contained no sludge dispersant. A quantity of such used oil was acquired by draining and refilling the taxicab crankcase at 1000-2000 mile intervals.

The SIB test is conducted in the following manner: the aforesaid used crankcase oil, which is milky brown in color, is freed of sludge by centrifuging for one hour at about 39,000 gravities (gs.). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount, such as 0.5, 1 or 2 weight percent, of the particular additive being tested. Ten grams of each blend being tested are placed in a stainless steel centrifuge tube and are heated at 135° C. for 16 hours in the presence of air. Following the heating, the tube containing the oil being tested is cooled and then centrifuged for about 30 minutes at room temperature at about 39,000 gs. Any deposits of new sludge that form in this step are separated from the oil by decanting the supernatant oil and then carefully washing the sludge deposits with 25 ml of heptane to remove all remaining oil from the sludge and further centrifuging. The weight of the new solid sludge that has been formed in the test, in milligrams, is determined by drying the residue and weighing it. The results are reported as amount of precipitated sludge in comparison with the precipitated sludge of a blank not containing any additional additive, which blank is normalized to a rating of 10. The less new sludge precipitated in the presence of the additive, the lower the SIB value and the more effective is the additive as a sludge dispersant. In other words, if the additive gives half as much precipitated sludge as the blank, then it would be rated 5.0 since the blank will be normalized to 10.

The VIB test was used to determine varnish inhibition. Here, each test sample consisted of 10 grams of lubricating oil containing a small amount of the additive being tested. The test oil to which the additive is admixed is of the same type as used in the above-described SIB test. Each ten gram sample was heat soaked overnight at about 140° C. and thereafter centrifuged to remove the sludge. The supernatant fluid of each was subjected to heat cycling from about 150oC to room temperature over a period of 3.5 hours at a frequency of about 2 cycles per minute During the heating phase, gas which was a mixture of about 0.7 volume percent $SO_2$, 1.4 volume percent NO and balance air was bubbled through the test samples. During the cooling phase, water vapor was bubbled through the test samples. At the end of the test period, which testing cycle can be repeated as necessary to determine the inhibiting effect of any additive, the wall surfaces of the test flasks in which the samples were contained are visually evaluated as to the varnish inhibition. The amount of varnish imposed on the walls is rated to values of from 1 to 11 with the higher number being the greater amount of varnish, in comparison with a blank with no additive that was rated 11.

10.00 grams of SIB test oil were mixed with 0.05 grams of the products of the Examples as described in Table II above and tested in the aforedescribed SIB and VIB tests.

The test results are summarized below in Table III.

TABLE III

| Test Sample | Additive | Dispersant (Wt. %) | SIB | VIB |
|---|---|---|---|---|
| Control | None | 0.5 | 10 | 11 |
| A | Ex. 1, Part B | 0.5 | 3.08 | 5 |
| B | Ex. 2, Part B | 0.5 | 2.94 | 5 |
| C | Ex. 3, Part B | 0.5 | 3.79 | 7 |
| D (Invention) | Ex. 4 | 0.5 | 2.90 | 3 |
| E (Invention) | Ex. 5 | 0.5 | 2.07 | 3.5 |

It is therefore seen that the novel dispersants of this invention provide greatly improved varnish exhibition and sludge dispersing ability as compared to conventional polyisobutenyl succinimide dispersants.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An oleaginous composition comprising (i) fuel oil and (ii) an adduct formed by reacting at least one long chain hydrocarbyl substituted mono- or polycarboxylic acid acylating agent and at least one heterocyclic polyol of the formula:

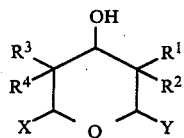

wherein $R^1$, $R^2$, $R^3$ and $R^4$ are the same or different and are selected from the group consisting of H, alkyl and —CH(OH)$R^5$, wherein $R^5$ is hydrogen or an alkyl of from 1 to 10 carbon atoms and X and Y are the same or different and are H or alkyl of from 1 to 10 carbon atoms, with the proviso that at least one of $R^1$, $R^2$, $R^3$ and $R^4$ is the —CH(OH)$R^5$ moiety, wherein said long chain hydrocarbon polymer has a number average molecular weight of from about 700 to about 5000.

2. The composition according to claim 1, wherein said alkyl groups contain from 1 to 5 carbon atoms.

3. The composition according to claim 1, wherein at least 3 of said $R^1$, $R^2$, $R^3$ and $R^4$ groups comprise said —CH(OH)$R^5$ moiety, wherein $R^5$ is alkyl of from 1 to 5 carbon atoms.

4. The composition according to claim 3, wherein each of said $R^1$, $R^2$, $R^3$ and $R^4$ groups comprise said —CH(OH)$R^5$ moiety.

5. The composition according to claim 1, wherein said composition comprises a concentrate and wherein said adduct is present in said concentrate in an amount of from about 20 to 80 weight percent.

6. The composition according to claim 1 wherein said oleaginous material is present therein in a major amount and said adduct is present therein in a dispersant effective amount.

7. The composition according to claim 6 wherein said adduct is present in an amount of from about 0.001 to about 0.5 weight percent of said composition.

8. The composition according to any of claims 1 and 2 to 7 wherein said acylating agent comprises a long chain hydrocarbyl-substituted succinic acid or anhydride.

9. The composition according to claim 8 wherein said long chain hydrocarbyl substituent comprises polyisobutylene having a number average molecular weight of from about 700 to about 5000.

10. The composition according to claim 9 wherein $R^5$ is hydrogen.

11. The composition according to any of claims 1 and 2 to 7 wherein said adduct is present in an amount of from 0.001 to about 0.1 weight percent of said composition.

12. The composition of claim 11 wherein said fuel oil comprises a normally liquid petroleum fuel.

* * * * *